US009365911B2

(12) United States Patent
Denton

(10) Patent No.: US 9,365,911 B2
(45) Date of Patent: Jun. 14, 2016

(54) SELECTIVE REGENERATION OF ISOTOPE-SPECIFIC MEDIA RESINS IN SYSTEMS FOR SEPARATION OF RADIOACTIVE ISOTOPES FROM LIQUID WASTE MATERIALS

(71) Applicant: Kurion, Inc., Richland, WA (US)

(72) Inventor: Mark S. Denton, Knoxville, TN (US)

(73) Assignee: Kurion, Inc., Irvine, CA (US)

( * ) Notice: Subject to any disclaimer, the term of this patent is extended or adjusted under 35 U.S.C. 154(b) by 228 days.

(21) Appl. No.: 13/850,908

(22) Filed: Mar. 26, 2013

(65) Prior Publication Data

US 2013/0302224 A1   Nov. 14, 2013

Related U.S. Application Data

(60) Provisional application No. 61/615,516, filed on Mar. 26, 2012.

(51) Int. Cl.
| | |
|---|---|
| C02F 1/00 | (2006.01) |
| C22B 26/20 | (2006.01) |
| B01D 39/16 | (2006.01) |
| C02F 1/42 | (2006.01) |
| G21F 9/00 | (2006.01) |
| B01D 59/30 | (2006.01) |
| C22B 3/00 | (2006.01) |
| G21F 9/04 | (2006.01) |
| G21F 9/30 | (2006.01) |

(52) U.S. Cl.
CPC ............ *C22B 26/20* (2013.01); *B01D 39/1623* (2013.01); *B01D 59/30* (2013.01); *C02F 1/42* (2013.01); *C22B 23/0461* (2013.01); *G21F 9/007* (2013.01); *G21F 9/04* (2013.01); *G21F 9/305* (2013.01)

(58) Field of Classification Search
None
See application file for complete search history.

(56) References Cited

U.S. PATENT DOCUMENTS

| | | | | |
|---|---|---|---|---|
| 3,340,200 | A * | 9/1967 | Noble | 521/26 |
| 4,280,984 | A * | 7/1981 | Miyake et al. | 423/6 |
| 4,389,253 | A | 6/1983 | Nishimura et al. | |
| 4,469,628 | A | 9/1984 | Simmons | |
| 4,585,583 | A | 4/1986 | Robertson | |
| 4,773,997 | A | 9/1988 | Butte | |
| 5,089,217 | A | 2/1992 | Corpora | |
| 5,250,187 | A | 10/1993 | Franks | |
| 5,885,925 | A | 3/1999 | DeFilippi | |
| 5,960,368 | A | 9/1999 | Pierce | |
| 6,109,349 | A | 8/2000 | Simone | |
| 6,143,106 | A | 11/2000 | Shane | |
| 6,159,437 | A | 12/2000 | Itoi | |
| 6,459,010 | B1 | 10/2002 | Carpena | |
| 6,485,404 | B1 | 11/2002 | Powell | |
| 6,986,842 | B2 | 1/2006 | Bortnik | |
| 7,115,542 | B2 | 10/2006 | Tranter | |
| 7,390,934 | B1 | 6/2008 | Kimura | |
| 2003/0213750 | A1 | 11/2003 | Koslow | |
| 2004/0081604 | A1 * | 4/2004 | Lemaire et al. | 423/157 |
| 2004/0138514 | A1 | 7/2004 | Tranter et al. | |
| 2007/0297858 | A1 | 12/2007 | Imbrie | |
| 2010/0020915 | A1 | 1/2010 | Beets | |
| 2011/0077144 | A1 | 3/2011 | Jessen | |
| 2011/0224473 | A1 | 9/2011 | Denton | |
| 2011/0224474 | A1 * | 9/2011 | Denton | 588/20 |
| 2013/0264273 | A1 | 10/2013 | Denton | |

FOREIGN PATENT DOCUMENTS

| | | | |
|---|---|---|---|
| EP | 0173484 | * | 3/1986 |
| EP | 111839 | | 6/1987 |
| EP | 243557 A1 | | 11/1987 |
| EP | 2831889 | | 2/2015 |
| JP | 50-127100 A | | 9/1975 |
| JP | 56-137299 A | | 10/1981 |
| JP | 57-042508 A | | 3/1982 |
| JP | 62-011510 A | | 1/1987 |
| JP | 64-091096 A | | 4/1989 |
| JP | 05-066295 A | | 3/1993 |
| JP | 08-105998 A | | 4/1996 |
| JP | 11-193293 | | 7/1999 |

(Continued)

OTHER PUBLICATIONS

King, L. & Opelka, J., Three Mile Iland Cleanup: Experiences, Waste Disposal, and Environmental Impact, vol. 78, 1982, American Inst of Chemical Engineers, NY; 48 pages.

(Continued)

*Primary Examiner* — Steven Bos

(74) *Attorney, Agent, or Firm* — Schwabe, Williamson & Wyatt

(57) ABSTRACT

Processes, systems, and methods for selectively regenerating an ion exchange resin generally comprises washing the ion exchange resin with an elution agent that encourages only selected contaminants, and especially selected radioactive isotopes, to disengage or decouple from the resin and enter solution in the elution agent, which thereafter is identified as the elution agent solution. The elution agent solution is then passed through a column of isotope-specific media (ISM). When the selected radioactive isotopes within the elution agent solution come into contact with the constituent media isotopes of the ISM, the selected radioactive isotopes are retained on the reactive surface areas of the ISM or within the interstitial spaces of the porous structures of the constituent media isotopes of the ISM. In some embodiments, the constituent media isotopes of the ISM are embedded, impregnated, or coated with the specific radioactive isotope that the particular ISM are adapted to separate.

10 Claims, 4 Drawing Sheets

(56) References Cited

FOREIGN PATENT DOCUMENTS

| | | | |
|---|---|---|---|
| JP | H11193293 | A | 7/1999 |
| JP | 2000-506827 | A | 6/2000 |
| JP | 2002-267795 | A | 9/2002 |
| JP | 2005-500158 | A | 1/2005 |
| JP | 2005-091116 | A | 4/2005 |
| JP | 2015-503469 | A | 2/2015 |
| WO | 99/62828 | A1 | 12/1999 |
| WO | 01/04415 | B1 | 6/2001 |
| WO | 01/95342 | A1 | 12/2001 |
| WO | 03/073011 | A2 | 9/2003 |
| WO | 2009/045230 | | 4/2009 |
| WO | 2009/051878 | * | 4/2009 |
| WO | 2013/191780 | A2 | 12/2013 |
| WO | 2013/191781 | | 12/2013 |

OTHER PUBLICATIONS

Hujie et al., "Zeolite Adsorption to Simulated Radioactive Nuclein", Journal of Southwest University of Science and Technology, vol. 21., No. 3, pp. 1-4 and 18, Sep. 2006.

Huanyan et al., "Adsorption fo Aqueous Cadmium on Carbonate Hydroxyapatite", J. Mineral Petrol, vol. 24, No. 1, pp. 108-112, Mar. 2004.

* cited by examiner

SELECTIVE REGENERATION OF ISOTOPE-SPECIFIC MEDIA RESINS IN SYSTEMS FOR SEPARATION OF RADIOACTIVE ISOTOPES FROM LIQUID WASTE MATERIALS

CROSS-REFERENCE TO RELATED APPLICATIONS

This Application claims the benefit under 35 U.S.C. section 119(e) of U.S. Provisional Application Ser. No. 61/615,516, filed Mar. 26, 2012.

STATEMENT REGARDING FEDERALLY-SPONSORED RESEARCH OR DEVELOPMENT

Not Applicable

BACKGROUND OF THE INVENTION

1. Field of Invention

The present invention relates generally to the treatment of radioactive waste, and in particular, to the separation and regeneration/reclamation of specific radioactive isotopes from radioactive waste materials.

2. Description of the Related Art

Radioactive isotopes are commonly found in radioactive waste materials from numerous devices and processes associated with the use of nuclear energy, such as for example devices and processes associated with nuclear power plants. In nuclear power plants, radioactive isotopes leak into the primary and secondary water loops of light water nuclear reactors. This leakage is an unavoidable result of the decay of nuclear fuel as well as the nuclear activation (through exposure to radiation from the reactor core) of reactor components. The capability to isolate and manage specific radioactive isotopes is necessary for clean, safe, and secure radioactive waste management, which in turn is essential for the safe and cost-effective use of nuclear energy.

The concentration of particular radioactive isotopes in waste materials generally determines the waste classification of the waste material (for example, Class A, Class B, or Class C in the United States; or low level waste, intermediate level waste, or high level waste [LLW, ILW, or HLW] in other countries). The waste classification of waste material in turn delineates the storage and disposal requirements for that waste material. As a rule, waste material that receives a higher classification (such as Class B or Class C) faces stricter storage and disposal requirements, is more costly to manage, and can be legally stored in fewer locations. Therefore, it is desirable to limit the volume and amount of waste material that receives a higher classification by separating or removing from that waste material those specific radioactive isotopes that drive waste classification. In this regard, particularly desirable are systems, methods and processes for the separation of Cs-137, Sr-90, Ni-63, Tc-99, Am-241, Co-58, Co-60, and several isotopes of Uranium. It would also be advantageous for the isotope-separation technology to facilitate and work with technology for the processing of those specific radioactive isotopes for long-term storage or disposal, as for example through solidification or vitrification.

One method for removing radioactive isotopes from a liquid carrier, such as for example water, is to pass the liquid carrying the radioactive isotopes through an ion exchange media, consisting essentially of a substantially insoluble matrix, typically in the form of small beads or granules, which collectively define a structure of pores on the surface of which are sites with easily trapped and released non-radioactive ions. As the liquid carrying the radioactive isotopes passes through the ion exchange media, the radioactive isotopes are exchanged with the non-radioactive ions in the matrix, thereby trapping the radioactive isotopes within the ion exchange media and retaining the radioactive isotopes therein. The result is a liquid carrying fewer radioactive isotopes and a "depleted" ion exchange media having the removed radioactive isotopes trapped therein in place of the non-radioactive ions.

Because the above-discussed ion exchange process traps radioactive isotopes in the ion exchange media, the depleted media itself becomes radioactive. Accordingly, once the ion exchange media becomes substantially fully, or even partially, depleted, the depleted ion exchange media typically must also be disposed of as radioactive waste. And, as discussed above, the concentration of particular radioactive isotopes in the depleted ion exchange media generally determines the waste classification of the depleted media, which in turn delineates the storage and disposal requirements for the depleted media. Accordingly, it is desirable to limit the amount of depleted ion exchange media that receives a higher classification (i.e., that receives a classification greater than Class A).

BRIEF SUMMARY OF THE INVENTION

The present general inventive concept, in several of its embodiments, includes devices, processes, and methods for the use of ion exchange resin in the separation of specific radioactive isotopes from radioactive waste.

In some example embodiments of the present general inventive concept, a process for selectively regenerating an ion exchange resin generally comprises washing the ion exchange resin (hereinafter, simply "resin") with an elution agent that encourages only selected contaminants, and especially selected radioactive isotopes, to disengage or decouple from the resin and enter solution in the elution agent, which thereafter is identified as the elution agent solution. The elution agent solution is then passed through a much smaller volume of isotope-specific media (ISM), thus achieving volume reduction (VR). When the selected radioactive isotopes within the elution agent solution come into contact with the constituent media isotopes of the ISM, the selected radioactive isotopes are retained on the reactive surface areas of the ISM or within the interstitial spaces of the porous structures of the constituent media isotopes of the ISM. In some embodiments, the constituent media isotopes of the ISM are embedded, impregnated, or coated with the specific radioactive isotope that the particular ISM are adapted to separate.

In some example embodiments of the present general inventive concept, a system for selectively regenerating ion exchange resins includes a high integrity container to hold ion exchange resin from a nuclear reactor system primary coolant loop, a selective regenerant agent to wash said ion exchange resin so as to produce a wash solution containing selected radioactive isotopes, and isotope-specific media to remove selected radioactive isotopes from said wash solution.

In some embodiments, said selective regenerant agent includes a chelating regenerant agent.

In some embodiments, said selected radioactive isotope is an isotope of an element selected from the group consisting of cesium, strontium, and nickel.

Some embodiments further include a subsystem configured for thermal treatment of said wash solution.

Some embodiments further include a subsystem configured for microwave treatment of said wash solution.

Some embodiments further include a subsystem configured for vitrification of said wash solution, or for vitrification of said isotope-specific media.

In some example embodiments of the present general inventive concept, a method for treating ion exchange resin containing radioactive isotopes includes obtaining ion exchange resin from a nuclear reactor system primary coolant loop, holding said ion exchange resin in a high integrity container, washing said ion exchange resin with a selective regenerant agent to produce a wash solution containing radioactive isotopes, and treating said wash solution.

In some embodiments, treating said wash solution includes mixing said wash solution with isotope specific media to remove a selected radioactive isotope from said wash solution.

In some embodiments, said selected radioactive isotope is an isotope of an element selected from the group consisting of cesium, strontium, and nickel.

In some embodiments, treating said wash solution includes vitrifying said wash solution.

In some embodiments, treating said wash solution includes applying microwave radiation to said wash solution to evaporate some liquid from said wash solution.

In some embodiments, treating said wash solution includes vitrifying said wash solution.

In some embodiments, treating said wash solution includes directing said wash solution into a waste treatment coolant loop of the nuclear reactor system.

In some embodiments, said selective regenerant agent includes a chelating regenerant agent.

BRIEF DESCRIPTION OF THE DRAWINGS

The above-mentioned and additional features of the invention will become more clearly understood from the following detailed description of the invention read together with the drawings in which.

DETAILED DESCRIPTION OF THE INVENTION

The present general inventive concept, in several of its embodiments, includes devices, processes, and methods for the use of isotope-specific ion exchange media (hereinafter "ISM") in the separation, isolation, or removal (collectively "separation") of specific radioactive isotopes from the elution of commercial radioactive resins. In some embodiments, the processes and methods further include the thermal treatment (microwave treatment or vitrification) of the separated isotopes, generally with the depleted ISM. This isotope-specific vitrification (ISV) is often a step in a larger scheme of preparing the radioactive isotopes for long-term storage or other disposition. In many cases, a combined process that includes both isotope separation using a measure of ISM and isotope-specific vitrification (i.e., a combined ISM/ISV process) is part of a larger system for treating radioactive waste.

In some example embodiments of the present general inventive concept, a process for selectively regenerating an ion exchange resin generally comprises washing the ion exchange resin with an elution agent that encourages only selected contaminants, and especially selected radioactive isotopes, to disengage or decouple from the resin and enter solution in the elution agent, which thereafter is identified as the elution agent solution. The elution agent solution is then passed through a column of isotope-specific media (ISM). When the selected radioactive isotopes within the elution agent solution come into contact with the constituent media particles of the ISM, the selected radioactive isotopes are retained on the reactive surface areas of the ISM or within the interstitial spaces of the porous structures of the constituent media particles of the ISM. In some embodiments, the constituent media particles of the ISM are embedded, impregnated, or coated with the specific radioactive isotope that the particular ISM are adapted to separate.

Figure 1:
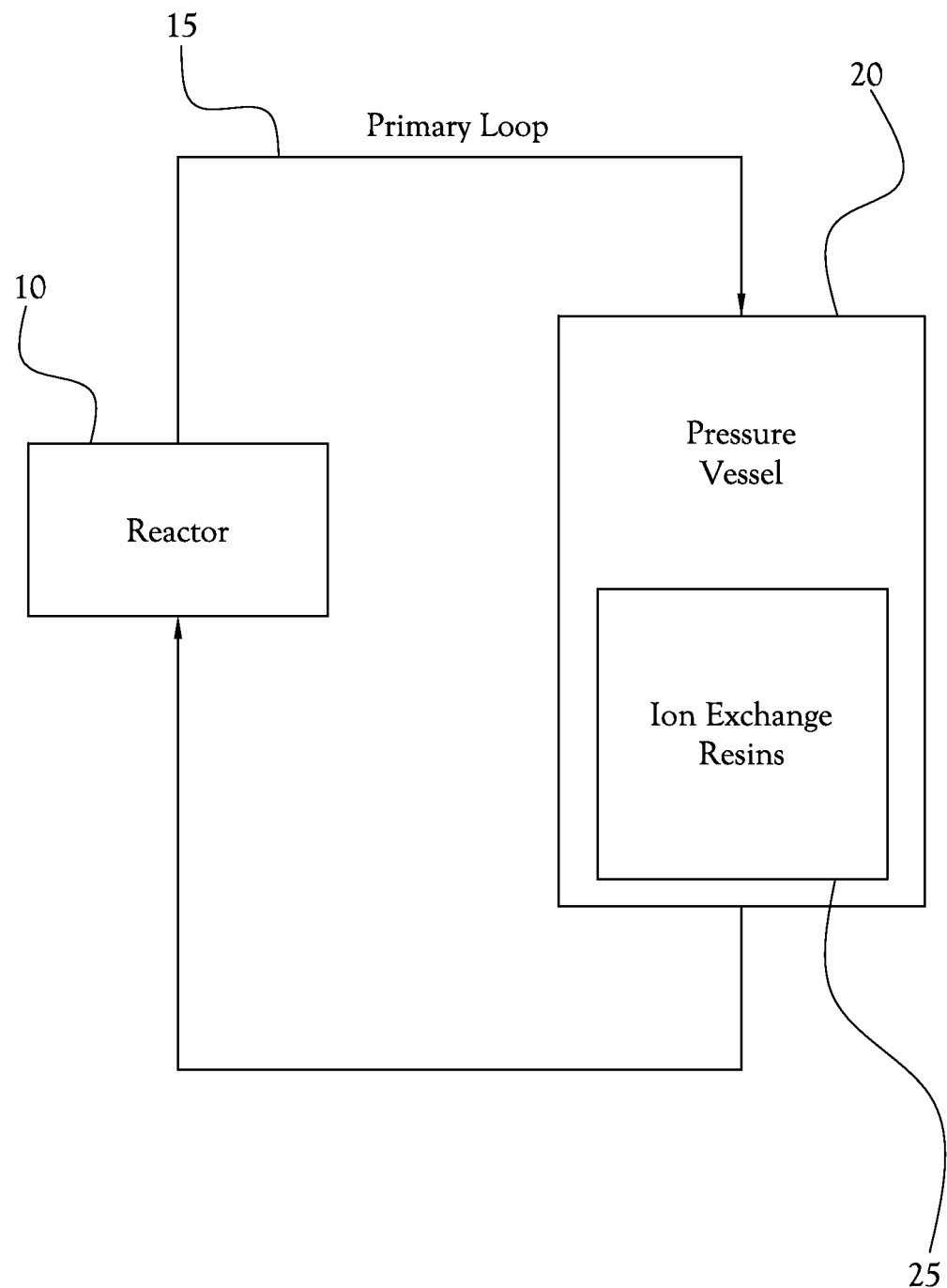
FIG. 1 is a block diagram illustrating one example embodiment of a nuclear reactor primary loop, including a pressure vessel and ion exchange resin for filtering radioactive isotopes and radioactive contaminants from water cycling through the primary loop.
Figure 2:
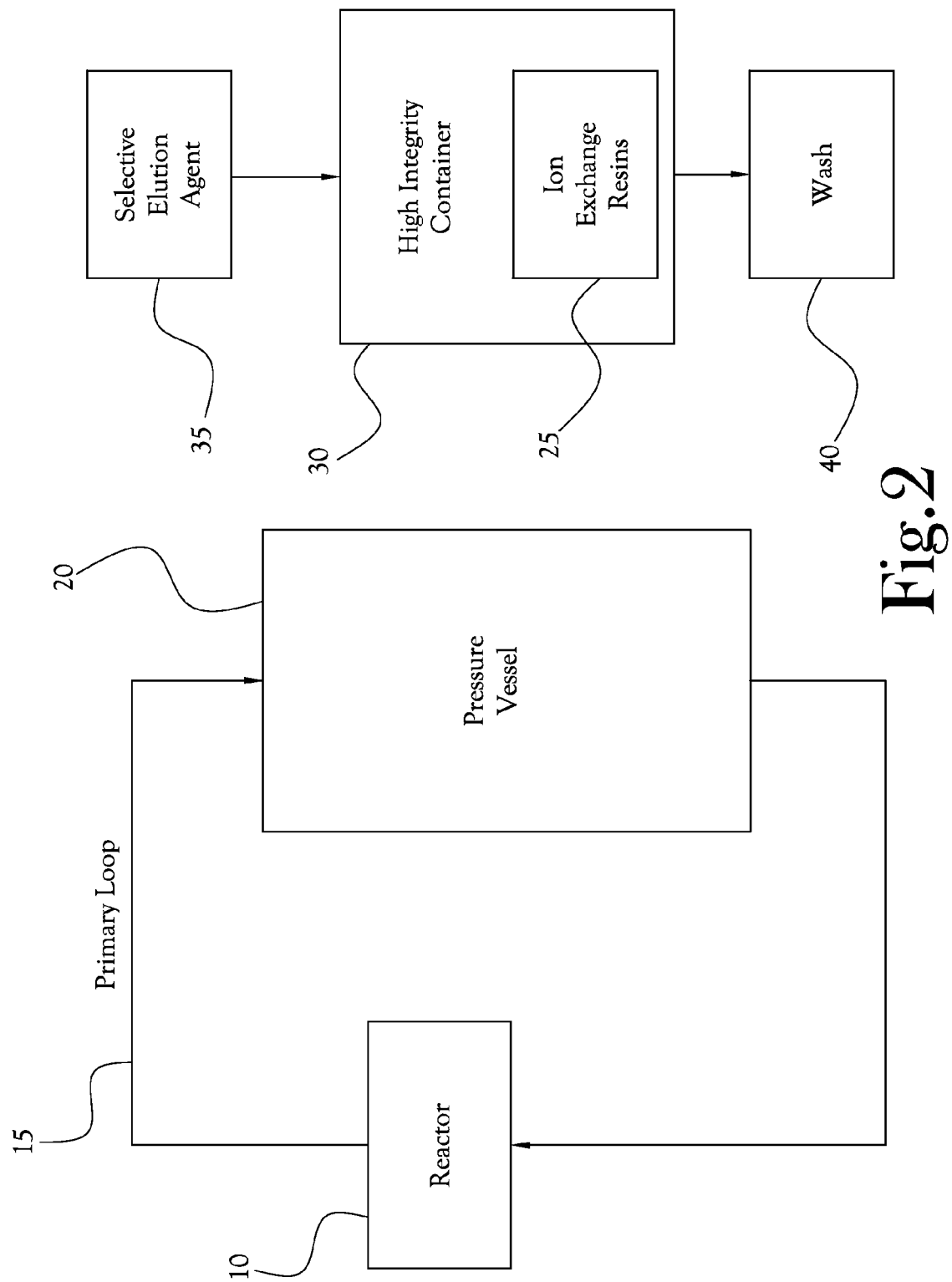
FIG. 2 is a block diagram illustrating one example embodiment of a system according to the present general inventive concept, including an high integrity container to hold ion exchange resin and a selective elution agent to wash the ion exchange resin.

One example embodiment of the present general inventive concept is illustrated generally in FIGS. 1 and 2. As shown in the block diagram of FIG. 1, reactor water from a nuclear reactor 10 is circulated within a primary loop 15, which passes the reactor water through a pressure vessel 20, which contains ion exchange resins 25. The ion exchange resins 25 remove radioactive isotopes and radioactive contaminants from the reactor water. In this process, radioactive isotopes and radioactive contaminants from the reactor water become attached to (or are retained on) the ion exchange resins 25. The reactor water then emerges from the pressure vessel 20 without the radioactive isotopes and radioactive contaminants, and generally the reactor water is then recycled through the reactor 10.

When the radioactive isotopes and radioactive contaminants are retained on the ion exchange resins 25, the ion exchange resins 25 often exhibit levels and concentrations of class-driving radioactive isotopes and radioactive contaminants, including levels of Nickel-63 and Cesium-137, which lead the ion exchange resins 25 to be classified as a higher level of Low Level Waste (such as Class B Level Waste or Class C Level Waste). Removing selected class-driving radioactive isotopes and radioactive contaminants from the ion exchange resins 25 allows the ion exchange resins 25 to then be classified and disposed of as a lower level of Low Level Waste (e.g. Class A Low Level Waste).

FIG. 2 is a block diagram illustrating in general terms one example embodiment of a process for removing selected class-driving radioactive isotopes and radioactive contaminants from the ion exchange resins 25 in order to allow the ion exchange resins 25 to then be classified as a lower level of Low Level Waste (e.g. Class A Level Waste). As shown in FIG. 2, the ion exchange resins 25 are removed from the pressure vessel 20 and held in a high integrity container (or "HIC") 30. A selective elution agent 35 is then added to the HIC 30, and the ion exchange resins 25 are washed with the selective elution agent 35. During the washing process, the selective elution agent bonds with, chelates to, or otherwise attaches to or attracts one or more type of radioactive isotopes or radioactive contaminants, separating said radioactive isotopes or radioactive contaminants from the ion exchange resins 25. The washing process produces a wash solution 40, which includes the selective elution agent and the radioactive isotopes or radioactive contaminants removed from the ion exchange resins.

Figure 3:
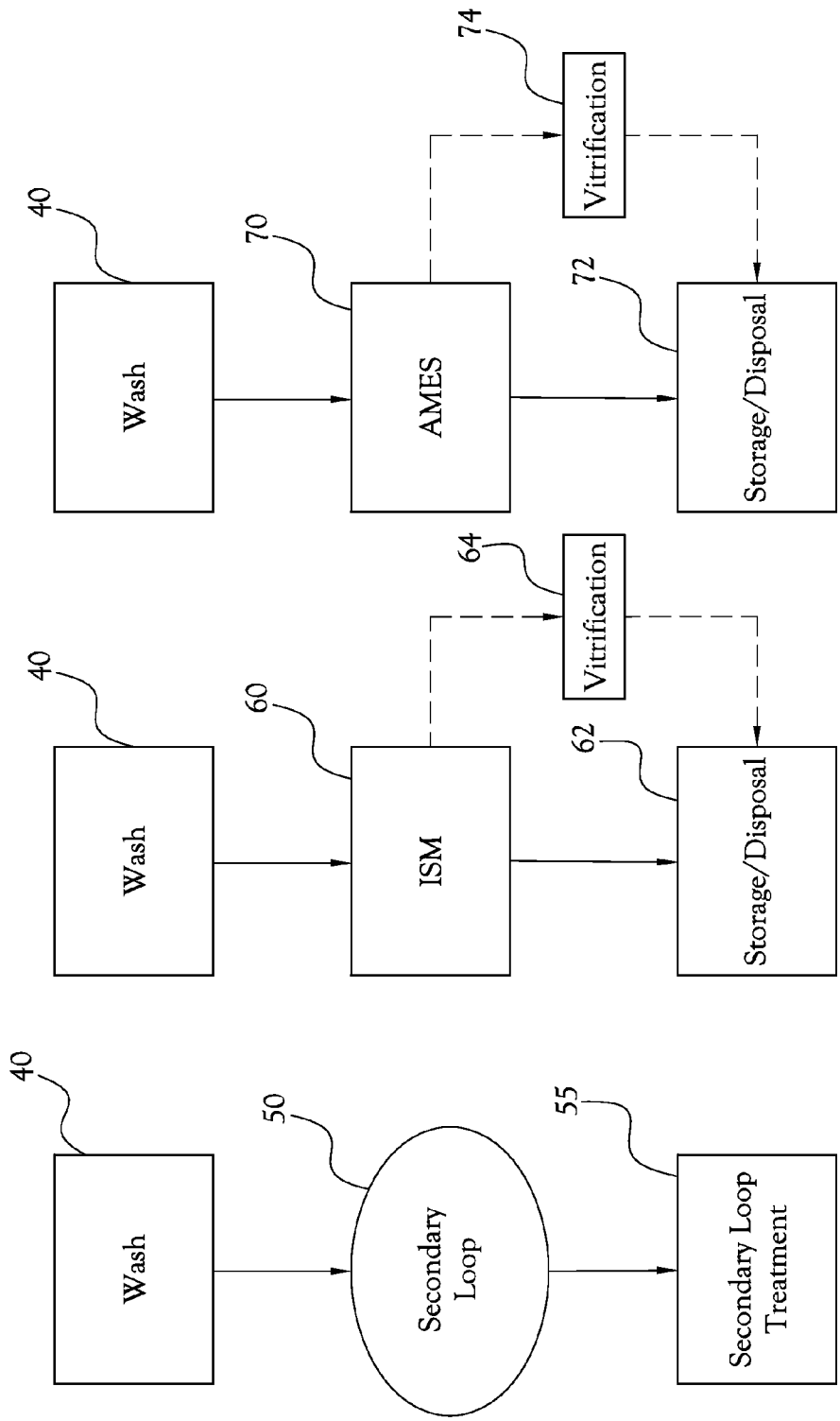
FIG. 3A is a block diagram illustrating one example embodiment of a method for treating a wash solution produced by washing ion exchange resin with a selective elution agent, in which the wash solution is directed into the secondary loop of the nuclear reactor system.
FIG. 3B is a block diagram illustrating one example embodiment of a method for treating a wash solution produced by washing ion exchange resin with a selective elution agent, in which the wash solution is treated with isotope-specific media and is optionally subject to vitrification, microwave treatment, or other thermal treatment.
FIG. 3C is a block diagram illustrating one example embodiment of a method for treating a wash solution produced by washing ion exchange resin with a selective elution agent, in which the wash solution is thermally treated by microwave to achieve volume reduction and organic destruction in the case of chelating agent regenerants, and in which vitrification is an optional additional volume reduction thermal step.

FIGS. 3A, 3B, and 3C are block diagrams that illustrate, in general terms, various example embodiments for the processing of the wash solution 40 that includes the selective elution agent and the radioactive isotopes or radioactive contaminants removed from the ion exchange resins.

As shown in FIG. 3A, in some example embodiments, the wash solution 40 is directed into the secondary loop 50 of the nuclear reactor system, where the wash solution undergoes the same treatment 55 as the other solutions and liquids in the secondary loop 50.

As shown in FIG. 3B, in some example embodiments, the wash solution 40 is mixed with ISM 60 in order to concentrate the class-driving isotope in question, before the storage or disposal 62 of the concentrated class-driving isotope. In some embodiments, vitrification 64 is an optional additional volume reduction thermal step. In some embodiments, microwave treatment is an optional volume reduction thermal step.

As shown in FIG. 3C, in some example embodiments, the wash solution 40 is thermally treated by microwave 70 to achieve volume reduction and organic destruction in the case of chelating agent regenerants. The treated wash solution then proceeds to storage or disposal 72. In some embodiments, vitrification 74 is an optional additional volume reduction thermal step.

Figure 4:
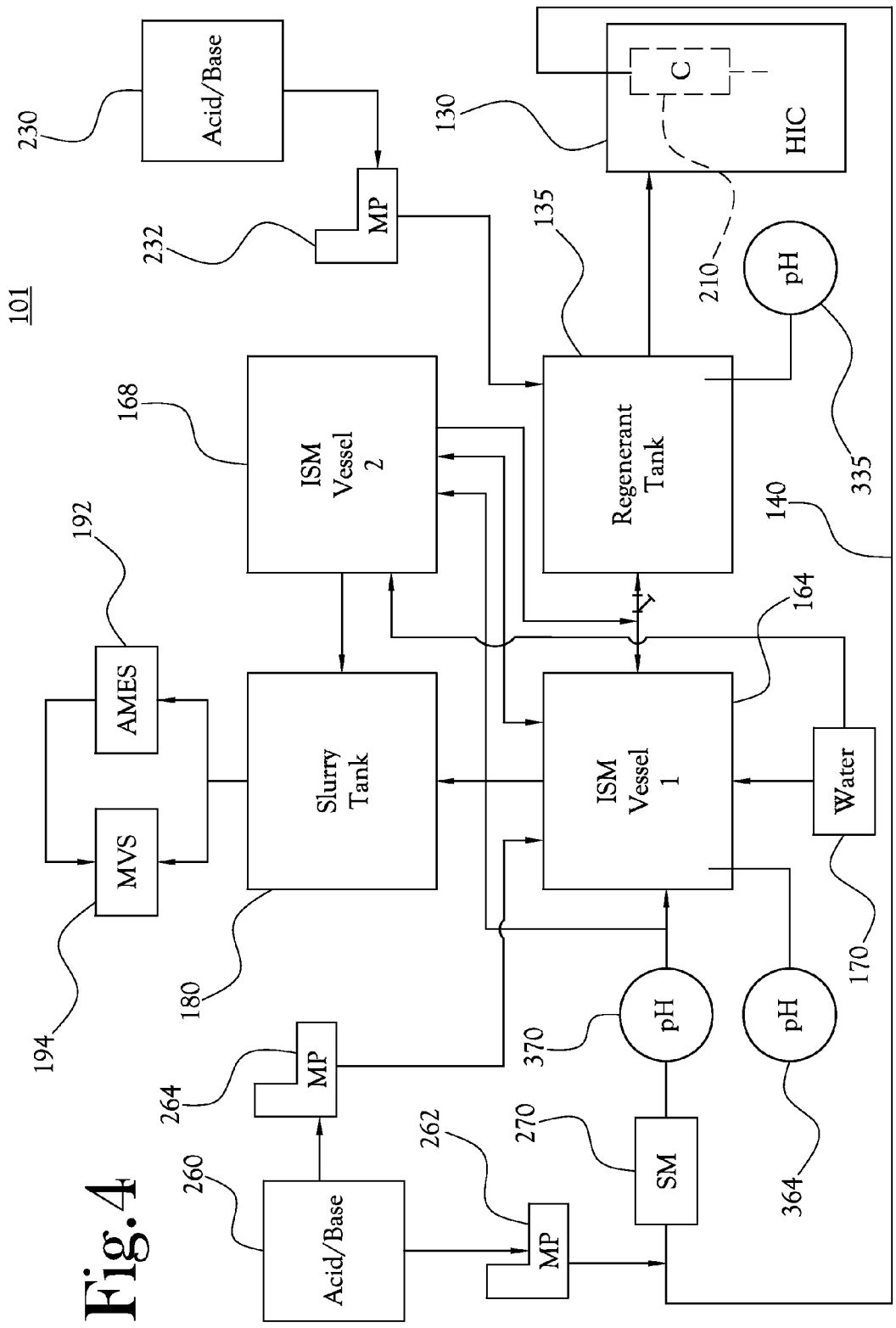
FIG. 4 is a block diagram illustrating one example embodiment of a system according to the present general inventive concept, showing multiple ISM vessels for selectively removing radioactive isotopes and radioactive contaminants from wash solution from a high integrity container.

FIG. 4 is a block diagram illustrating one example embodiment according to the present general inventive concept of a radioactive waste treatment system utilizing selective elution of radioactive isotopes and radioactive contaminants as part of the selective regeneration of ion exchange resins. As shown in FIG. 4, in the illustrated example embodiment the system 101 includes an HIC 130, which holds ion exchange resins, and a regenerant tank 135. The regenerant tank 135 provides a selective elution agent or regenerant agent (hereinafter collectively "regenerant agent") to the HIC 130; within the HIC 130, the ion exchange resins are washed with the selective elution agent, so that the selective elution agent bonds with, chelates to, or otherwise attaches to or attracts one or more type of radioactive isotopes or radioactive contaminants, separating said radioactive isotopes or radioactive contaminants from the ion exchange resins. The washing process produces a wash solution, which includes the selective elution agent and the radioactive isotopes or radioactive contaminants removed from the ion exchange resins. This wash solution exits the HIC 130 through a line 140, which conveys or directs the wash to a first ISM vessel 164. Within the first ISM vessel 164, a first set of isotope specific media (hereinafter "media") interact with the wash and generally remove one selected radioactive isotope from the wash solution (although in some embodiments, the first set of media will remove more than one selected radioactive isotope or radioactive contaminant). The selected radioactive isotope is deposited on, attached to, or retained on the first set of media within the first ISM vessel 164. Following this, the wash solution generally is directed into a second ISM vessel 168, which contains a second set of isotope specific media to remove a second selected radioactive isotope from the wash solution if needed. (By way of example, in some embodiments, the first ISM vessel 164 includes media to remove Nickel-63 from the wash solution, and the second ISM vessel 168 includes media to remove Cesium-137 from the wash solution. In some embodiments, the first ISM vessel 164 includes media to remove nickel from the wash solution, and the second ISM vessel 168 includes media to remove strontium from the wash solution. In some embodiments, the first ISM vessel 164 includes media to remove cesium from the wash solution, and the second ISM vessel 168 includes media to remove strontium from the wash solution. In some embodiments, the first ISM vessel 164 includes media to remove nickel from the wash solution, and the second ISM vessel 168 includes media to remove cesium from the wash solution. Other combinations and variations on these combinations will be apparent to those of skill in the art.)

In some embodiments, when the wash solution has been passed through the first set of media in the first ISM vessel 164 and through the second set of media in the second ISM vessel 168, the wash solution proceeds to a slurry tank 180. From the slurry tank 180, the wash solution generally either proceeds directly to vitrification, e.g., to a modular vitrification system (MVS) 194, or proceeds first through microwave treatment, e.g. through an advanced microwave evaporation system 192, and thence on to vitrification, e.g., MVS 194.

In several embodiments, additional regenant agent can be moved from the regenerant tank 135 to the first ISM vessel 164 or the second ISM vessel 168, as needed. In several embodiments, wash solution can be directed between the first ISM vessel 164, the second ISM vessel 168, and the regenerant tank 135 as needed. Those of skill in the art will recognize that the present general inventive concept also embraces and contemplates similar systems with, for example, more than two ISM tanks.

In several embodiments, the system 101 includes other components that assist in managing the selective regeneration process. For example, in some embodiments, the HIC 130 contains within itself an optional column 210 to remove trace amounts of cesium from inside the HIC 130. In some embodiments, the system includes an acid/base storage reservoir 230 and connected metering pump to adjust the pH level within the regenerant tank 135. Some embodiments also include an acid/base storage reservoir 260 and connected metering pumps 262 and 264 to adjust the pH level within the wash solution entering the first ISM vessel 164 and to adjust the pH level within the first ISM vessel 164. Some embodiments include an acid/base storage reservoir and connected metering pumps to adjust the pH level within the second ISM vessel 168. Some embodiments include a static mixer 270 to mix materials being fed into the first ISM vessel 164. Further, in some embodiments, the system 101 includes pH sensors 335, 364, 370 to measure the pH level of the wash solution or regenerant agent at various points within the selective regeneration process.

From the foregoing description, it will be recognized that an apparatus and associated process and method for the use of isotope-specific ion exchange media in the separation of specific radioactive isotopes from radioactive waste has been disclosed. The apparatus and associated method of the present general inventive concept allows for the selective regeneration of specific radioactive isotopes from commercial resins and the collection of these radioactive isotopes from the liquid radioactive waste material on isotope-specific ion exchange media.

While the present invention has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A method for treating ion exchange resin containing radioactive isotopes comprising:
    obtaining the ion exchange resin from a nuclear reactor system primary coolant loop;
    containing said ion exchange resin in a high integrity container;
    washing said ion exchange resin while contained in the high integrity container with a selective regenerant agent to produce a wash solution comprising one or more types of the radioactive isotopes;
    treating said wash solution by mixing said wash solution with isotope specific media to remove a selected radioactive isotope from said wash solution, wherein the radioactive isotope is retained within the isotope specific media to concentrate the radioactive isotope within the isotope specific media;
    separating out the isotope specific media from said wash solution; and vitrifying said wash solution that has been separated from the isotope specific media.

2. The method of claim 1 wherein said selected radioactive isotope is an isotope of an element selected from the group consisting of cesium, strontium, and nickel.

3. The method of claim 1 further comprising evaporating liquid from the wash solution after the isotope specific media has been separated from said wash solution.

4. The method of claim 3 wherein the wash solution is vitrified after the liquid has been evaporated.

5. The method of claim 1 further comprising directing said wash solution that includes the one or more types of radioactive isotopes into a secondary coolant loop of the nuclear reactor system.

6. The method of claim 1 wherein said selective regenerant agent includes a chelating regenerant agent.

7. The method of claim 3 wherein the liquid is evaporated by thermally treating said wash solution.

8. The method of claim 3 wherein the liquid is evaporated by heating said wash solution with microwaves.

9. The method of claim 1 further comprising treating said wash solution by mixing said wash solution with a second isotope specific media to remove a second radioactive isotope from said wash solution, wherein the second radioactive isotope is retained within the second isotope specific media to concentrate the second radioactive isotope within the second isotope specific media, and wherein said wash solution is vitrified after removing the second radioactive isotope.

10. The method of claim 9 wherein the selected radioactive isotope comprises nickel, and wherein the second radioactive isotope comprises cesium or strontium.

* * * * *